United States Patent
Prins

(10) Patent No.: US 10,500,898 B1
(45) Date of Patent: Dec. 10, 2019

(54) SIDE-MOUNTED CASTER SYSTEM FOR STEERING THREE-WHEELED PUSH CHAIRS

(71) Applicant: Off Road Access, LLC, Laguna Hills, CA (US)

(72) Inventor: Douglas A. Prins, Laguna Hills, CA (US)

(73) Assignee: Off Road Access, LLC, Laguna Hills, CA (US)

( * ) Notice: Subject to any disclaimer, the term of this patent is extended or adjusted under 35 U.S.C. 154(b) by 0 days.

(21) Appl. No.: 15/963,918

(22) Filed: Apr. 26, 2018

Related U.S. Application Data

(60) Provisional application No. 62/492,859, filed on May 1, 2017.

(51) Int. Cl.
*B60B 33/00* (2006.01)
*B62B 7/04* (2006.01)

(52) U.S. Cl.
CPC ...... *B60B 33/0076* (2013.01); *B60B 33/0057* (2013.01); *B62B 7/042* (2013.01); *B62B 7/044* (2013.01); *B60B 33/0039* (2013.01); *B62B 2301/04* (2013.01)

(58) Field of Classification Search
CPC ...... B62B 7/044; B62B 7/046; B62B 2301/04
USPC ................. 280/38, 62, 656, DIG. 6
See application file for complete search history.

(56) References Cited

U.S. PATENT DOCUMENTS

| | | | | |
|---|---|---|---|---|
| 4,289,324 A * | 9/1981 | Nemeth | .................... | B60R 1/04 16/29 |
| 4,847,945 A * | 7/1989 | Schwartz | ............ | B60B 33/0078 16/30 |
| 4,953,880 A * | 9/1990 | Sudakoff | .................... | B62B 7/06 280/47.38 |
| 5,188,389 A * | 2/1993 | Baechler | .................... | B62B 7/10 280/62 |
| 5,267,744 A * | 12/1993 | Berry | ........................ | B62B 7/04 280/204 |
| 5,460,399 A * | 10/1995 | Baechler | ................. | B60B 37/10 188/20 |
| 5,474,316 A * | 12/1995 | Britton | ...................... | B62B 3/02 280/204 |
| 5,536,033 A * | 7/1996 | Hinkston | .................. | B62B 7/08 280/62 |
| 5,611,560 A * | 3/1997 | Thimmig | ................... | B62B 7/14 280/642 |
| 5,669,100 A * | 9/1997 | Carpenter | ............. | B60B 33/021 16/35 R |
| 5,829,771 A * | 11/1998 | Hsu | ...................... | B62D 63/061 280/204 |
| 5,863,061 A | 1/1999 | Ziegler et al. | | |
| 5,979,921 A * | 11/1999 | Derven | ................ | B62K 15/006 280/204 |

(Continued)

*Primary Examiner* — Jeffrey J Restifo
(74) *Attorney, Agent, or Firm* — Donald E. Stout; Stout, Uxa & Buyan, LLP

(57) ABSTRACT

A three-wheeled all-terrain vehicle or push chair utilizes an innovative front wheel mount, employing a side-mounted caster mechanism, for improving its pushability and steerability. Because of this approach, lifting is not required to steer the chair, and any size or type and width of wheel can be used. As a result, the invention provides a new class of all-terrain product for the disabled adult market and a rugged, truly off-road runner/jogger/hiker stroller for the young child market.

14 Claims, 3 Drawing Sheets

(56) References Cited

U.S. PATENT DOCUMENTS

| | | | | |
|---|---|---|---|---|
| 6,036,220 | A * | 3/2000 | Zhen | B62B 7/10 |
| | | | | 280/62 |
| 7,000,928 | B2 * | 2/2006 | Liao | B62B 1/002 |
| | | | | 280/38 |
| 7,048,283 | B2 * | 5/2006 | Wu | B62B 3/12 |
| | | | | 280/38 |
| 7,137,644 | B2 * | 11/2006 | Kimberley | B62B 3/12 |
| | | | | 280/651 |
| 7,445,222 | B2 * | 11/2008 | Bell | B60D 1/00 |
| | | | | 280/204 |
| 7,552,931 | B2 * | 6/2009 | Liao | B62B 3/02 |
| | | | | 280/47.34 |
| 7,770,912 | B2 * | 8/2010 | Liao | B62B 3/02 |
| | | | | 280/62 |
| 8,002,363 | B2 * | 8/2011 | Cheng | B60B 33/0002 |
| | | | | 16/30 |
| 8,104,777 | B2 * | 1/2012 | Liao | B62B 3/02 |
| | | | | 280/38 |
| 8,128,104 | B2 * | 3/2012 | Liao | B62B 3/02 |
| | | | | 280/38 |
| 8,439,390 | B2 * | 5/2013 | Zhang | B62B 3/02 |
| | | | | 280/47.34 |
| 8,500,140 | B1 * | 8/2013 | Liao | B62B 7/10 |
| | | | | 280/38 |
| 9,227,649 | B2 * | 1/2016 | Wu | B62B 7/083 |
| 9,233,704 | B2 * | 1/2016 | Wu | B62B 7/083 |
| 9,283,977 | B2 * | 3/2016 | Wu | B62B 7/006 |
| 9,764,752 | B2 * | 9/2017 | Liao | B62B 3/025 |
| 2005/0140105 | A1 | 6/2005 | Hernandez | |

* cited by examiner

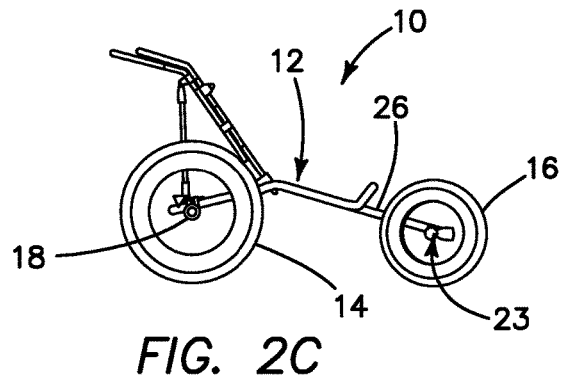
FIG. 2C
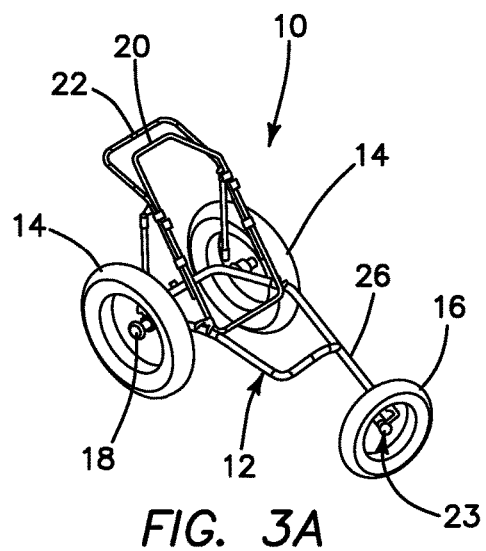
FIG. 3A
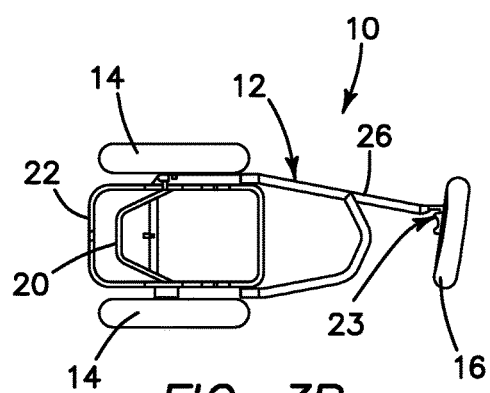
FIG. 3B
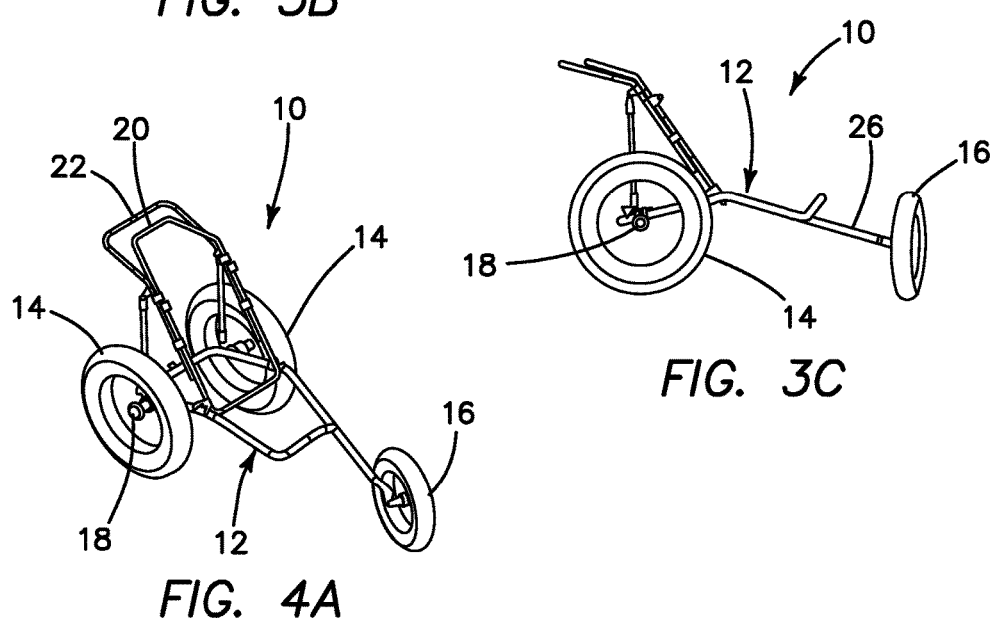
FIG. 3C
FIG. 4A

SIDE-MOUNTED CASTER SYSTEM FOR STEERING THREE-WHEELED PUSH CHAIRS

This application claims the benefit under 35 U.S.C. 119(e) of the filing date of Provisional U.S. Application Ser. No. 62/492,859, entitled Side-Mounted Caster System for Steering Three-Wheeled Push Chairs, and filed on May 1, 2017, which application is herein expressly incorporated by reference, in its entirety.

BACKGROUND OF THE INVENTION

The present invention relates generally to systems and methods for improving the ease of pushing and steering three-wheeled all-terrain push chairs and strollers which are suited and sized for both adults and children and ruggedized for use on roads, trails, sand, and snow.

In recent decades, jogging strollers for young children and push chairs for larger people, including adults who typically deal with a disability or physical challenge of some kind, have been constructed to be more rugged than was the case for earlier generations of such vehicles, so that passengers and those pushing the vehicles can enjoy off-road unpaved trails and the like without undue difficulty.

Such prior art devices often employ three wheels, rather than four. Prior art push chairs or jogging strollers having three wheels have two fixed-directional wheels in the rear, and a third wheel centered toward the front of the push chair frame. In such constructions, the front wheel is usually fixed. A three-wheeled stroller, even with an in-line fixed front wheel, is significantly easier to steer than a four-wheeled stroller having the same diameter wheel sets, and three-wheeled contact is more stable than four. Steering may be accomplished by pushing down on the handlebar and lifting and turning the front wheel toward the desired direction. This must be done very often, even to maintain fairly straight paths. For children, their weight is small enough so that this is not overly difficult, though the repeated need to reset the direction of the stroller is inconvenient. However, for disabled adults, the lifting and re-setting process can be onerous, particularly for smaller-framed users.

Other approaches, as shown, for example, in U.S. Pat. No. 5,863,061, herein expressly incorporated by reference, utilize a front wheel which is mounted to the frame of the device using a vertical shaft disposed to permit the wheel to swivel about the vertical axis of the shaft for the purpose of steering the vehicle. However, these freely swivelable wheels also create steerability issues on rugged or soft terrain, such as sand, wherein the front wheel often becomes bogged down in the sand or loose dirt, in part because it is easily pushed by the terrain and swiveled toward a direction the user does not wish to go. As a result, the front of the stroller must often be lifted to free the wheel and swivel it back to the desired travel direction.

SUMMARY OF THE INVENTION

The present invention addresses the foregoing problems by providing an innovative front wheel mount for improving the pushability and steerability of three-wheeled all terrain push chairs and strollers of the type described above.

Specifically, the inventive systems solve the above described steering problems by employing a side-mounted caster mechanism. Because of this approach, lifting is not required to steer the chair, and any size or type and width of wheel can be used. As a result, the invention provides a new class of all-terrain product for the disabled adult market and a rugged, truly off-road runner/jogger/hiker stroller for the young child market.

More particularly, in one aspect of the invention there is provided a three-wheeled push chair, which comprises a frame having a forward end, a rear end, and a width, two rear wheels attached to the rear end of the frame on opposing sides of the width of the frame, a handlebar extending from the rear end of the frame, a half-fork comprising the forward end of the frame, a single front wheel, and a caster assembly attaching the half-fork to the single front wheel on only one side of the front wheel. The half-fork and the caster assembly are disposed only on either the left side or the right side of the front wheel. The push chair, in an illustrated embodiment, comprises a stroller, and may be sized to accommodate adult-sized people.

The caster assembly comprises an axle rotatably supporting the front wheel and a pivot pin pivotally joining the axle to the half-fork to permit steering of the front wheel directionally. An axle plane lies along a length of the axle, wherein the pivot pin is disposed forwardly of the axle plane when the front wheel is in a straight orientation.

In another aspect of the invention, there is provided a three-wheeled push chair, which comprises a frame having a forward end, a rear end, and a width, two rear wheels attached to the rear end of the frame on opposing sides of the width of the frame, a handlebar extending from the rear end of the frame, a half-fork comprising the forward end of the frame, a single front wheel, and a caster assembly attaching the half-fork to the single front wheel. The caster assembly comprises an axle rotatably supporting the front wheel and a pivot pin pivotally joining the axle to the half-fork to permit steering of the front wheel directionally. An axle plane lies along a length of the axle, wherein the pivot pin is disposed forwardly of the axle plane when the front wheel is in a straight orientation. In some embodiments, the half-fork and the caster assembly are disposed only on a left side of the front wheel. In other embodiments, the half-fork and the caster assembly are disposed only on a right side of the front wheel. In illustrated embodiments, the push chair comprises a stroller, and may be sized to accommodate adult-sized people.

The invention, together with additional features and advantages thereof, may best be understood by reference to the following description taken in conjunction with the accompanying illustrative drawing.

BRIEF DESCRIPTION OF THE DRAWINGS

FIG. 2C is a side view of the vehicle shown in FIGS. 2A and 2B;

FIG. 3A is an isometric view of a third embodiment of a three-wheeled vehicle constructed in accordance with the principles of the present invention;

FIG. 3B is a top view of the vehicle shown in FIG. 3A;

FIG. 3C is a side view of the vehicle shown in FIGS. 3A and 3B;

FIG. 4A is an isometric view of a fourth embodiment of a three-wheeled vehicle constructed in accordance with the principles of the present invention;

DETAILED DESCRIPTION OF THE INVENTION

Figure 1A:
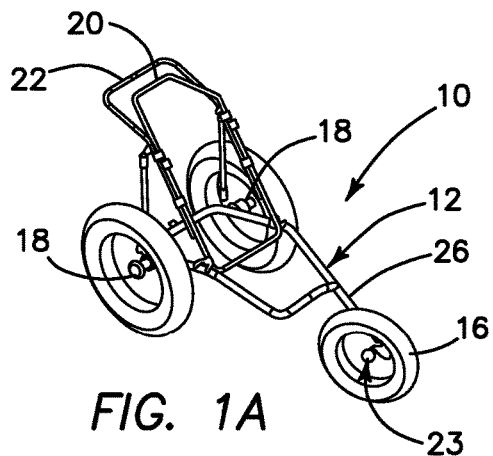
FIG. 1A is an isometric view of a first embodiment of a three-wheeled vehicle constructed in accordance with the principles of the present invention.

Referring now more particularly to the drawings, there is shown in the various figures a three-wheeled push chair or stroller (hereinafter push chair) 10 having a frame 12, rear wheels 14, and a front wheel 16. Rear wheels 14 are rotatably mounted on convention hubs 18, or may alternatively be mounted on a common axle (not shown), and may also be equipped with a braking/locking device to assist in slowing the push chair 10 more quickly, and/or in permitting the rear wheels to be rotatably locked. The frame 12 includes a handlebar 20 for a user to employ in pushing and steering the push chair 10, and may also include an actuator 22 for actuating the braking/locking device on the wheels 14.

Figure 5:
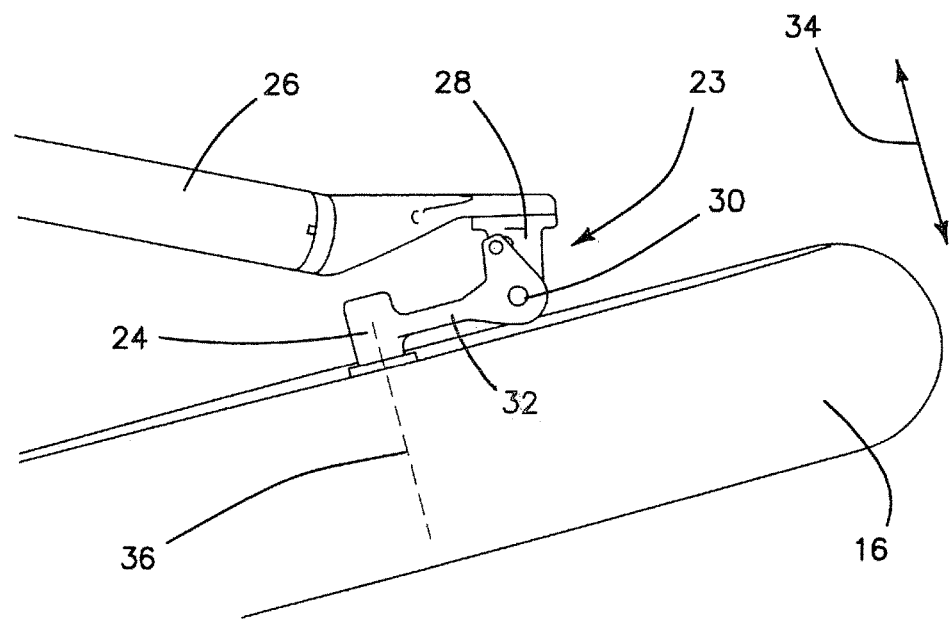
FIG. 5 is an enlarged view of the inventive side castor construction of a representative embodiment of the invention.

Now with reference particularly to FIG. 5, there is shown an enlarged view of the front wheel 16 and construction of the associated mounting system therefor, comprising a caster assembly 23 having an axle 24, to which the wheel 16 is rotatably mounted. A half-fork 26 includes a horizontally disposed pivot pin receptacle 28 at its forward end, through a hole of which a pivot pin 30 extends. The pivot pin 30 also extends through a hole in an attachment flange 32, which is horizontally disposed and extends from the axle 24. The pivot pin is forward of an axle plane 36, which lies along the axle 24, and this arrangement is a unique feature of the inventive system. This unique arrangement enables the axle 24, and wheel 16, to track the direction of the pivot pin 30. It is noted that the vertical location of the front half fork 26 is arbitrary, and in the present case was chosen for styling and function.

With reference now to all of the drawing figures, including FIG. 5, in use, with the front wheel 16 pivotally attached to the half fork 26 of the frame 12 by means of the caster assembly 23, as shown in FIG. 5, the front wheel 16 may be steered directionally by pointing the push chair 10 using the handlebars 20 in a desired direction, in response to which the wheel 16 follows by pivoting about the pivot pin 30. Steering or pivoting of the front wheel 16 may be achieved in either direction along arrow 34, up to mechanical limits imposed by contact of the wheel and associated assemblies with the frame 12, and specifically the half-fork 26. The angle through which the wheel 16 may be steered along arrow 34 is arbitrary. In the embodiment illustrated in FIG. 5, which is an enlarged version of the FIG. 1 embodiment, the caster assembly 23 is disposed on the left side of the wheel 16, because such an arrangement was found to easily accommodate a bicycle hitch which may optionally replace the front wheel 16 so that the push chair 10 can become a trailer. However, it is within the scope of the invention to dispose the caster assembly 23 on the right side of the wheel 16 instead.

Figure 1B:
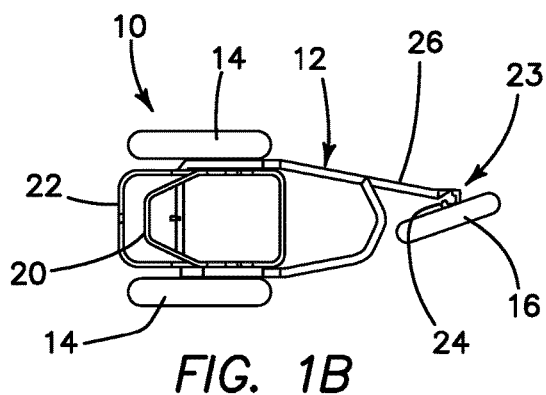
FIG. 1B is a top view of the vehicle shown in FIG. 1A.
Figure 1C:
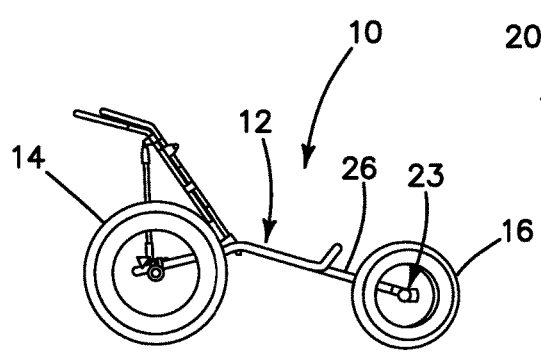
FIG. 1C is a side view of the vehicle shown in FIGS. 1A and 1B.
Figure 2A:
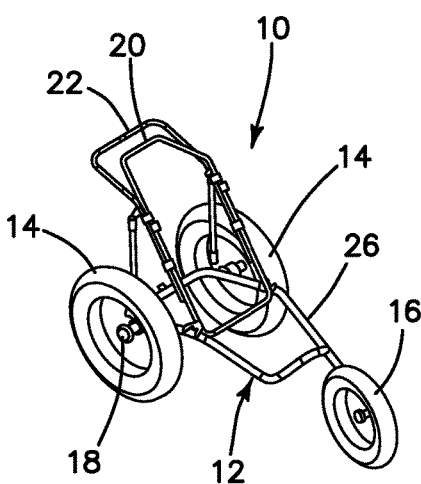
FIG. 2A is an isometric view of a second embodiment of a three-wheeled vehicle constructed in accordance with the principles of the present invention.
Figure 2B:
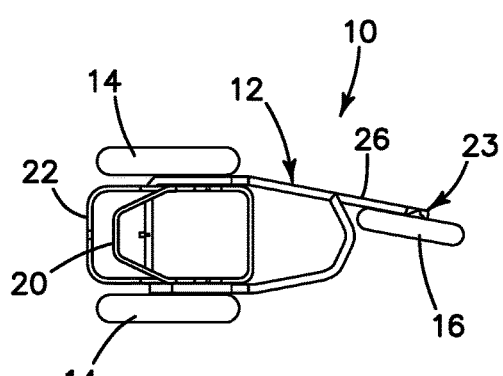
FIG. 2B is a top view of the vehicle shown in FIG. 2A.

The embodiment of FIGS. 2A-2C is similar to the embodiment of FIGS. 1A-1C, but the caster assembly 23 and half-fork 26 are differently arranged to permit pivoting of the front wheel 16 to the right, rather than to the left, as shown in FIGS. 1A-1C, as shown. This is a matter of design preference. It is still the case that the pivot pin 30 is disposed forwardly of the axle plane 36. In this embodiment, the wheel 16 may be turned to an angle of up to about 22 degrees to the right.

The embodiment of FIGS. 3A-3C is also similar to those of the earlier FIGS. 1A-1C and 2A-2C, except that the arrangement of the caster assembly 23 and half-fork 26, which in this case permits turning of the wheel 16 to about 90 degrees to the left, as shown.

Figure 4B:
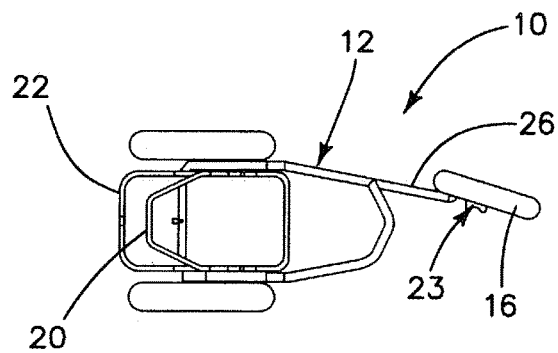
FIG. 4B is a top view of the vehicle shown in FIG. 4A.
Figure 4C:
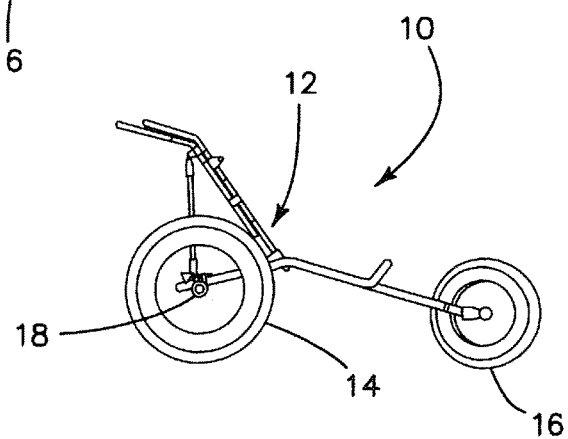
FIG. 4C is a side view of the vehicle shown in FIGS. 4A and 4B.

The embodiment of FIGS. 4A-4C is similar to those of the earlier FIGS. 1A-1C, 2A-2C, and 3A-3C, except that in this case, as discussed above, the half-fork 26 and caster assembly 23 are disposed on the right side of the wheel 16.

As can be seen from these various embodiments, the range of steering for the inventive system is limited only by the angle and size of the half-fork design.

It is noted that, for sake of clarity, a seat is not illustrated in the figures, so that the frame 12 may be more clearly identified and viewed. However, in practice, a seat is provided of course, to be supported by the frame 12 between the two rear wheels 14. The seat may be fixed in place, or may be removable in whole or in part for more compact folding of the frame 12 and for easier cleaning.

Accordingly, although exemplary embodiments of the invention have been shown and described, it is to be understood that all the terms used herein are descriptive rather than limiting, and that many changes, modifications, and substitutions may be made by one having ordinary skill in the art without departing from the spirit and scope of the invention.

What is claimed is:

1. A three-wheeled push chair, comprising:
a frame having a forward end, a rear end, and a width;
two rear wheels attached to the rear end of the frame on opposing sides of the width of the frame;
a handlebar extending from the rear end of the frame;
a half-fork comprising the forward end of the frame;
a single front wheel; and
a caster assembly attaching the half-fork to the single front wheel on only one side of the front wheel, the caster assembly comprising an axle rotatably supporting the front wheel, a pivot pin pivotally joining the axle to the half-fork to permit steering of the front wheel directionally, and an attachment flange extending horizontally from the axle forwardly to a pivot pin receptacle extending from the half-fork, the pivot pin being disposed through an aperture in a forward portion of the attachment flange to pivotally join the attachment flange to the pivot pin receptacle.

2. The three-wheeled push chair as recited in claim 1, wherein the half-fork and the caster assembly are disposed only on a left side of the front wheel.

3. The three-wheeled push chair as recited in claim 1, wherein the half-fork and the caster assembly are disposed only on a right side of the front wheel.

4. The three-wheeled push chair as recited in claim 1, wherein the push chair comprises a stroller.

5. The three-wheeled push chair as recited in claim 1, wherein the push chair is sized to accommodate adult-sized people.

6. The three-wheeled push chair as recited in claim 1, and further comprising an axle plane lying along a length of the axle, wherein the pivot pin is disposed forwardly of the axle plane when the front wheel is in a straight orientation.

7. A three-wheeled push chair, comprising:
a frame having a forward end, a rear end, and a width;

two rear wheels attached to the rear end of the frame on opposing sides of the width of the frame;

a handlebar extending from the rear end of the frame;

a half-fork comprising the forward end of the frame;

a single front wheel; and a caster assembly attaching the half-fork to the single front wheel on only one side of the front wheel, the caster assembly comprising:

an axle rotatably supporting the front wheel; and a pivot pin pivotally joining the axle to the half-fork to permit steering of the front wheel directionally;

wherein the caster assembly further comprises an attachment flange extending horizontally from the axle forwardly to a pivot pin receptacle extending from the half-fork, the pivot pin being disposed through an aperture in a forward portion of the attachment flange to pivotally join the attachment flange to the pivot pin receptacle.

8. The three-wheeled push chair as recited in claim 7, and further comprising an axle plane lying along a length of the axle, wherein the pivot pin is disposed forwardly of the axle plane when the front wheel is in a straight orientation.

9. The three-wheeled push chair as recited in claim 7, wherein the half-fork and the caster assembly are disposed only on a left side of the front wheel.

10. The three-wheeled push chair as recited in claim 7, wherein the half-fork and the caster assembly are disposed only on a right side of the front wheel.

11. The three-wheeled push chair as recited in claim 7, wherein the push chair comprises a stroller.

12. The three-wheeled push chair as recited in claim 7, wherein the push chair is sized to accommodate adult-sized people.

13. The three-wheeled push chair as recited in claim 1, wherein the pivot pin is disposed adjacent to and not above the front wheel.

14. The three-wheeled push chair as recited in claim 7, wherein the pivot pin is disposed adjacent to and not above the single front wheel.

* * * * *